US008931437B2

(12) United States Patent
Aaron et al.

(10) Patent No.: US 8,931,437 B2
(45) Date of Patent: Jan. 13, 2015

(54) PET RESTRAINT HARNESS SYSTEM FOR VEHICLES

(71) Applicant: Grandma Knows, Inc., Denver, CO (US)

(72) Inventors: Albert Glenn Aaron, Denver, CO (US); Mary L. Aaron, Denver, CO (US)

(73) Assignee: Grandma Knows, Inc., Denver, CO (US)

( * ) Notice: Subject to any disclaimer, the term of this patent is extended or adjusted under 35 U.S.C. 154(b) by 0 days.

(21) Appl. No.: 13/926,729

(22) Filed: Jun. 25, 2013

(65) Prior Publication Data

US 2013/0284113 A1    Oct. 31, 2013

Related U.S. Application Data

(63) Continuation of application No. 12/904,156, filed on Oct. 13, 2010, now Pat. No. 8,474,413.

(60) Provisional application No. 61/278,753, filed on Oct. 13, 2009.

(51) Int. Cl.
*B60R 22/10* (2006.01)
*A01K 1/02* (2006.01)
*A01K 27/00* (2006.01)

(52) U.S. Cl.
CPC ............. *B60R 22/10* (2013.01); *A01K 1/0263* (2013.01); *A01K 27/002* (2013.01); *A01K 1/0272* (2013.01)
USPC ........................................................ 119/771

(58) Field of Classification Search
CPC ..... A01K 1/0272; A01K 27/003; A01K 1/06; A01K 27/005; A01K 1/064; B60R 22/10; F16G 11/10

USPC .............. 119/769, 771, 772, 776, 856, 863; 297/188.06, 485
See application file for complete search history.

(56) References Cited

U.S. PATENT DOCUMENTS 2,833,344 A     5/1958  Lucht
2,909,154 A *  10/1959  Thomas ...................... 119/771
(Continued)

FOREIGN PATENT DOCUMENTS

| GB | 2395885 A | * | 6/2004 | ............ A01K 27/00 |
| JP | 2003189752 A | * | 7/2003 | ............ A01K 27/00 |
| WO | WO 03026463 A1 | * | 4/2003 | ............ A47D 15/00 |

OTHER PUBLICATIONS

Machine translation of JP 2003189752 to Tozawa, published Jul. 2003.*

(Continued)

*Primary Examiner* — Rob Swiatek
*Assistant Examiner* — Kathleen Alker
(74) *Attorney, Agent, or Firm* — Dorsey and Whitney LLP

(57) ABSTRACT

A pet restraint harness system for use in a vehicle may be installed in a rear or front passenger seat. The restraint system includes a harness fastened about the pet and a restraint framework fastened about the seat and, in some configurations, to manufacturer latch points provided in the vehicle. The restraint framework includes a vertical strap positioned against the seatback and one or more horizontal supports, such as lateral straps, attached to the vertical strap to resist lateral movement, vertical movement, or both. Ends of the vertical and lateral straps may attach to each other about the seat. At least two restraining straps are attached to the vertical strap, the horizontal supports, or among the combination of both. The restraining straps are configured to attach to an animal's collar, to a harness, or both.

16 Claims, 11 Drawing Sheets

(56) References Cited

U.S. PATENT DOCUMENTS

| | | | | |
|---|---|---|---|---|
| 3,099,486 A * | 7/1963 | Scott | | 297/465 |
| 3,115,364 A | 12/1963 | Berlin | | |
| 3,321,247 A * | 5/1967 | Dillender | | 297/465 |
| 3,779,599 A * | 12/1973 | Gottfried | | 297/253 |
| 3,954,280 A | 5/1976 | Roberts et al. | | |
| 3,992,040 A | 11/1976 | Gannac | | |
| 4,009,808 A | 3/1977 | Sharp | | |
| 4,026,245 A | 5/1977 | Arthur | | |
| 4,226,474 A | 10/1980 | Rupert et al. | | |
| 4,324,204 A * | 4/1982 | Friedman | | 119/771 |
| 4,428,514 A | 1/1984 | Elf | | |
| 4,601,667 A | 7/1986 | Hull | | |
| 4,674,800 A | 6/1987 | Ensign | | |
| 4,927,211 A | 5/1990 | Bolcerek | | |
| 4,970,991 A * | 11/1990 | Luce | | 119/771 |
| 4,976,494 A | 12/1990 | Polley | | |
| 5,046,433 A * | 9/1991 | Kramer et al. | | 108/44 |
| 5,188,421 A | 2/1993 | Arseneault | | |
| 5,292,175 A | 3/1994 | Artz | | |
| 5,443,037 A * | 8/1995 | Saleme | | 119/771 |
| 5,613,467 A * | 3/1997 | Arakawa | | 119/792 |
| 5,806,467 A * | 9/1998 | Arakawa | | 119/771 |
| 6,049,954 A | 4/2000 | Britto | | |
| 6,182,931 B1 | 2/2001 | Richard | | |
| D455,546 S | 4/2002 | Norman | | |
| 6,364,417 B1 | 4/2002 | Silverman | | |
| 6,402,241 B1 | 6/2002 | Mazzotti et al. | | |
| 6,767,058 B2 | 7/2004 | McClellan-Derrickson | | |
| 6,820,902 B2 | 11/2004 | Kim | | |
| 6,857,700 B2 | 2/2005 | Eastman | | |
| 6,877,809 B2 | 4/2005 | Yamazaki et al. | | |
| 6,893,088 B2 | 5/2005 | Kassai et al. | | |
| 6,916,066 B2 | 7/2005 | Sedlack | | |
| 7,004,541 B2 | 2/2006 | Sedlack | | |
| 7,131,703 B1 | 11/2006 | Sheridan | | |
| 7,210,707 B2 | 5/2007 | Schroth | | |
| 7,270,347 B1 * | 9/2007 | Zlojutro | | 280/801.1 |
| 7,347,494 B2 | 3/2008 | Boyle et al. | | |
| 7,357,099 B2 * | 4/2008 | Smith et al. | | 119/771 |
| 2006/0054109 A1 * | 3/2006 | Smith | | 119/856 |
| 2008/0136235 A1 | 6/2008 | Aaron | | |
| 2008/0184937 A1 * | 8/2008 | Hoffman et al. | | 119/28.5 |
| 2009/0230741 A1 | 9/2009 | Aaron | | |
| 2011/0181089 A1 * | 7/2011 | Hendricks et al. | | 297/391 |

OTHER PUBLICATIONS

Non-Final Office Action dated Sep. 27, 2012, U.S. Appl. No. 12/904,156, 11 pages.

Response to Non-Final Office Action dated Dec. 27, 2012, U.S. Appl. No. 12/904,156, 25 pages.

Notice of Allowance dated Feb. 20, 2013, U.S. Appl. No. 12/904,156, 10 pages.

Amendment Pursuant to 37 CFR 1.312 Interview Summary Comments on Reasons for Allowance dated May 20, 2013, U.S. Appl. No. 12/904,156, 10 pages.

Response to 312 Communication dated Jun. 3, 2013, U.S. Appl. No. 12/904,156, 2 pages.

* cited by examiner

PET RESTRAINT HARNESS SYSTEM FOR VEHICLES

CROSS REFERENCE TO RELATED APPLICATIONS

This application is a continuation of U.S. patent application Ser. No. 12/904,156 filed Oct. 13, 2010 entitled, "Pet restraint harness system for vehicles," now U.S. Pat. No. 8,474,413, which claims the benefit of priority pursuant to 35 U.S.C. §119(e) of U.S. provisional application No. 61/278,753 filed 13 Oct. 2009 entitled "Animal vehicle harness restraint system," which is hereby incorporated herein by reference in its entirety.

FIELD

The technology disclosed herein relates to passenger restraint devices for vehicles and, more specifically, to pet restraint devices for automobiles.

BACKGROUND

Pets frequently accompany their owners in automobiles, for example trips to the veterinarian, trips around town, or even on vacations. Some owners keep the pets in the back seat of their automobile while others allow their pets to sit in the front passenger seat. Automobile accidents are a potential hazard of driving. Most automobiles include restraint systems to protect the human occupants from substantial injuries if the vehicle is in an accident. However, automobiles do not include similar restraint systems for pets, such as dogs. Therefore, if a pet is accompanying an owner when the vehicle is in an accident the pet may be thrown throughout the vehicle and be injured. Further, unrestrained pets may actually be the cause of accidents if they interfere with the operation of the vehicle by the driver, e.g., by sitting in the driver's lap or jumping on the driver in attempts to investigate attractions outside of and within the vehicle.

The information included in this Background section of the specification, including any references cited herein and any description or discussion thereof, is included for technical reference purposes only and is not to be regarded subject matter by which the scope of the invention is to be bound.

SUMMARY

A pet restraint harness system is designed in various embodiments disclosed herein to provide comfortable restraint to animals (generally dogs or cats, but it can be modified in dimension to accommodate other types of animals) while riding in the rear or front passenger seat of an automobile or other vehicle. The system includes a restraint device including at least one vertical strap, the vertical strap is configured to secure the device to locations within the vehicle. For example, rings installed within the vehicle for securing child seats. The vertical strap may be attached to at least one restraining strap. The restraining strap includes a clasp or hook which may then be connected to an animal's collar or harness.

Other embodiments may include an animal restraint system including a harness and a restraining device having a vertical strap and a restraining strap. The vertical strap may rest vertically along a portion of a seat within the vehicle. The vertical strap includes a first attachment mechanism for securing the vertical strap to a first location within the vehicle. The restraining strap may be operably attached to the vertical strap. The restraining strap includes a clasp. The harness is configured to operably attach to the animal restraint device. The harness includes a body configured to wrap at least partially around a portion of an animal. A first belt and a second belt operably attached to the body. The first belt and second belt are configured to secure the body around the portion of the animal. The harness also includes an attachment mechanism operably connected to the first belt and configured to operably attach to the clasp on the restraining strap.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

Figure 1:
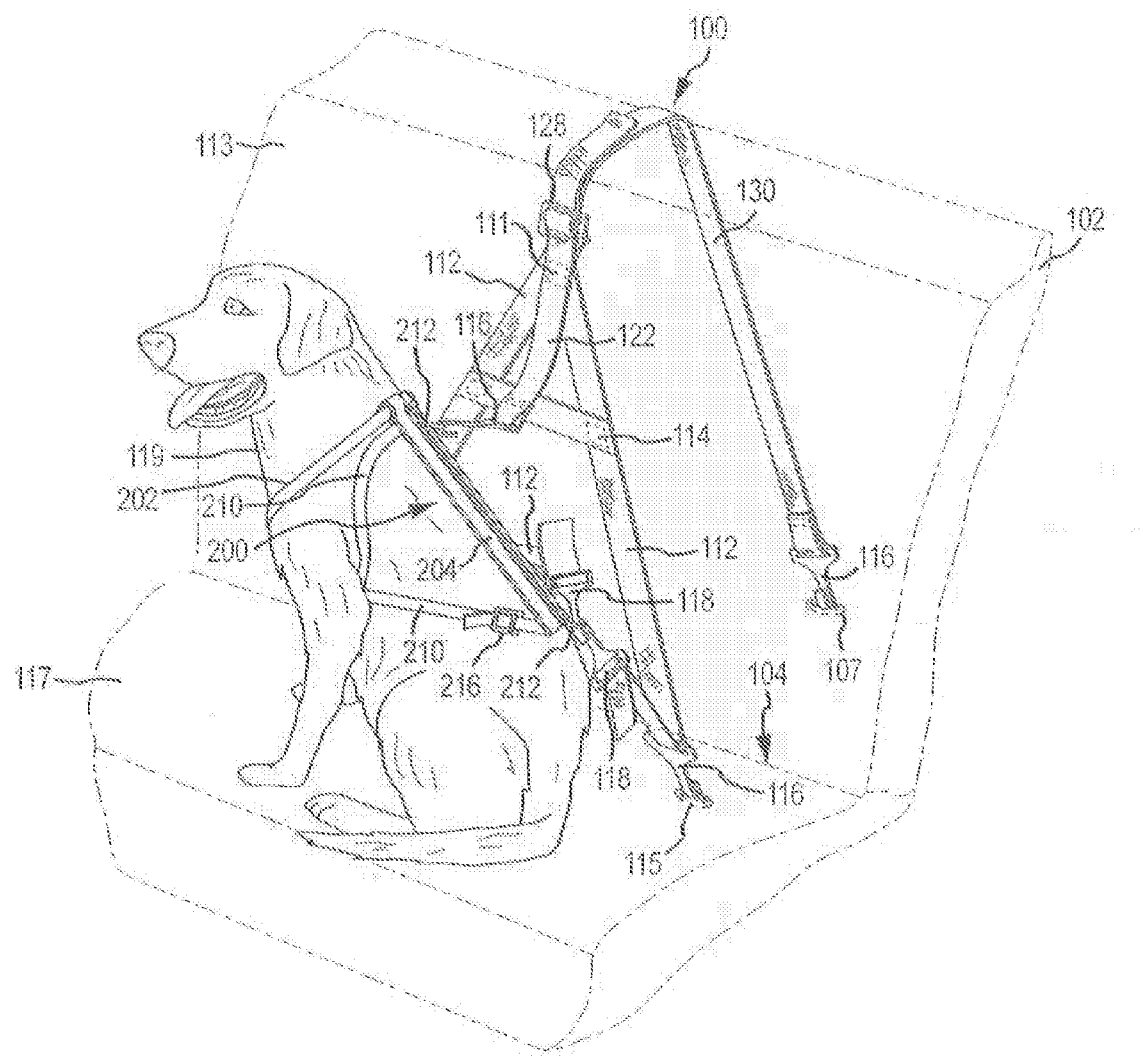
FIG. 1 is an isometric view of an embodiment of the pet restraint system installed about a back seat of a vehicle with manufacturer latch points depicting a dog secured to a framework via a harness.

Various implementations of a pet restraint system disclosed herein may be configured for use in either the front or the back passenger seats of a vehicle. In each of these embodiments, the system includes a vertical strap that extends along and over the top of the seatback. One end of the vertical strap may be attached to a manufacturer latch location on the top of the seatback or behind the rear seat in the vehicle via an slide hook or other mechanism. For example, vehicles sold in the United States since 2002 include loop anchors located variously within the seat bight or crack of the rear seat, on the top of the rear seat, or on the floor of vehicle behind the back seat. These anchors are provided to secure child safety seats within the vehicle. The other end of the vertical strap may attach to two angled straps as the vertical strap runs down the front of the back seat. These two angled straps may be secured together in a variety of locations, preventing either strap from sliding away from the other. The device may also include securing or restraining straps having attachment mechanisms configured to connect to an animal's collar, harness, etc., securing the animal to the seat. For example, the attachment mechanisms or connection devices may be hooks, latches or clips that attach to a ring or other device on the pet's collar or harness. In these embodiments, the restraint system may be secured to the vehicle via the vertical strap and the angled straps. This helps to ensure that the restraint system does not substantially move within the vehicle. Additionally, each strap may be separately adjustable, allowing the restraint system to be used in multiple types of vehicles (and seats) as well as with multiple types of animals.

In other embodiments, the pet restraint system may include a vertical strap that extends over the front or back seat of a vehicle. In these embodiments, the vertical strap may extend over the top of the seatback as well as under the seatback (between the top and bottom cushions). Thus, the vertical strap may wrap around the seatback, securing the restraint system to the vehicle. The vertical strap may be tightened around the seatback and/or may connect to a securing location under the seat. For example, the back seat of the vehicle may include hooks, or the bottom of the seat may include a bar, to which the attachment mechanisms on the vertical strap may be attached. Also, the vertical strap may be adjustable and may be shortened or lengthened. This allows the system to better fit the seat, and thus be bettered secured to the vehicle. The system may also include horizontal or securing straps attached to the vertical strap. These straps may also be separately adjustable, and each strap includes an attachment mechanism and/or connection/securing device. The attachment mechanisms may be used to secure the restraint system to a collar or harness of the animal. There may be multiple securing straps, depending on the level of animal movement desired to be prevented.

Furthermore, these embodiments may additionally include headrest straps for better securing the system to the headrest of vehicle. For example, some front seats may include a separate headrest, e.g., a headrest that includes posts used to raise and lower the headrest. In these embodiments, a horizontal securing element such as one or more post straps may be configured to warp around the posts. The post strap secures the restraint system on the posts when the headrest is in place on top of the front seat. In vehicles without headrests, the vertical strap may be configured to travel over the top of the seatback and connected to a horizontal strap at locations on the front of the vehicle seat and at the back of the vehicle seat. The horizontal straps wrap around the sides of the seatback attaching to the vertical strap at the front and back of the seatback. This allows the vertical strap to be secured around the seatback and resist slipping vertically and substantially preventing the restraint system from moving around on the front seat.

In other embodiments, a harness for use with the restraint system is disclosed. The harness is secured to the animal, and provides attachment points/locations to attach the animal to the restraint system. For example, the harness may include rings to which the clips/hooks of the restraint system may be attached. In some embodiments, the harness may include a body that is secured around the animal through belting or other straps. The straps may wrap around and meet at a singular point, which may be configured to be the chest of the animal (when wearing the harness). Additionally, the harness may include multiple adjustable mechanisms such that the harness may be used on a variety of animals and breeds. The harness may also be used separately from the pet restraint device. For example, a leash may be attached to the rings and/or other connection devices.

Figure 2:
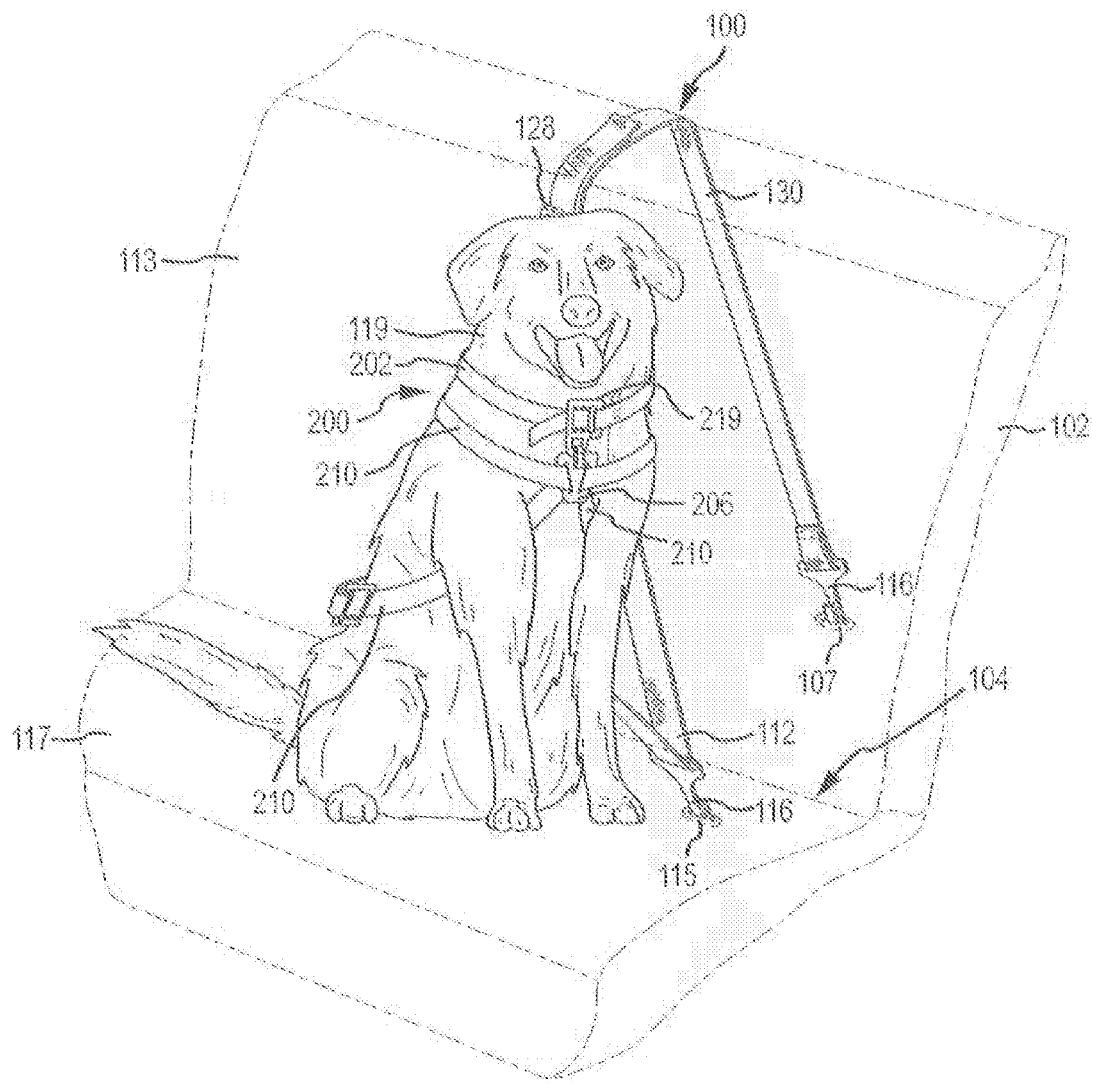
FIG. 2 is an isometric view of the pet restraint system of FIG. 1 with the dog positioned facing another direction.
Figure 3:
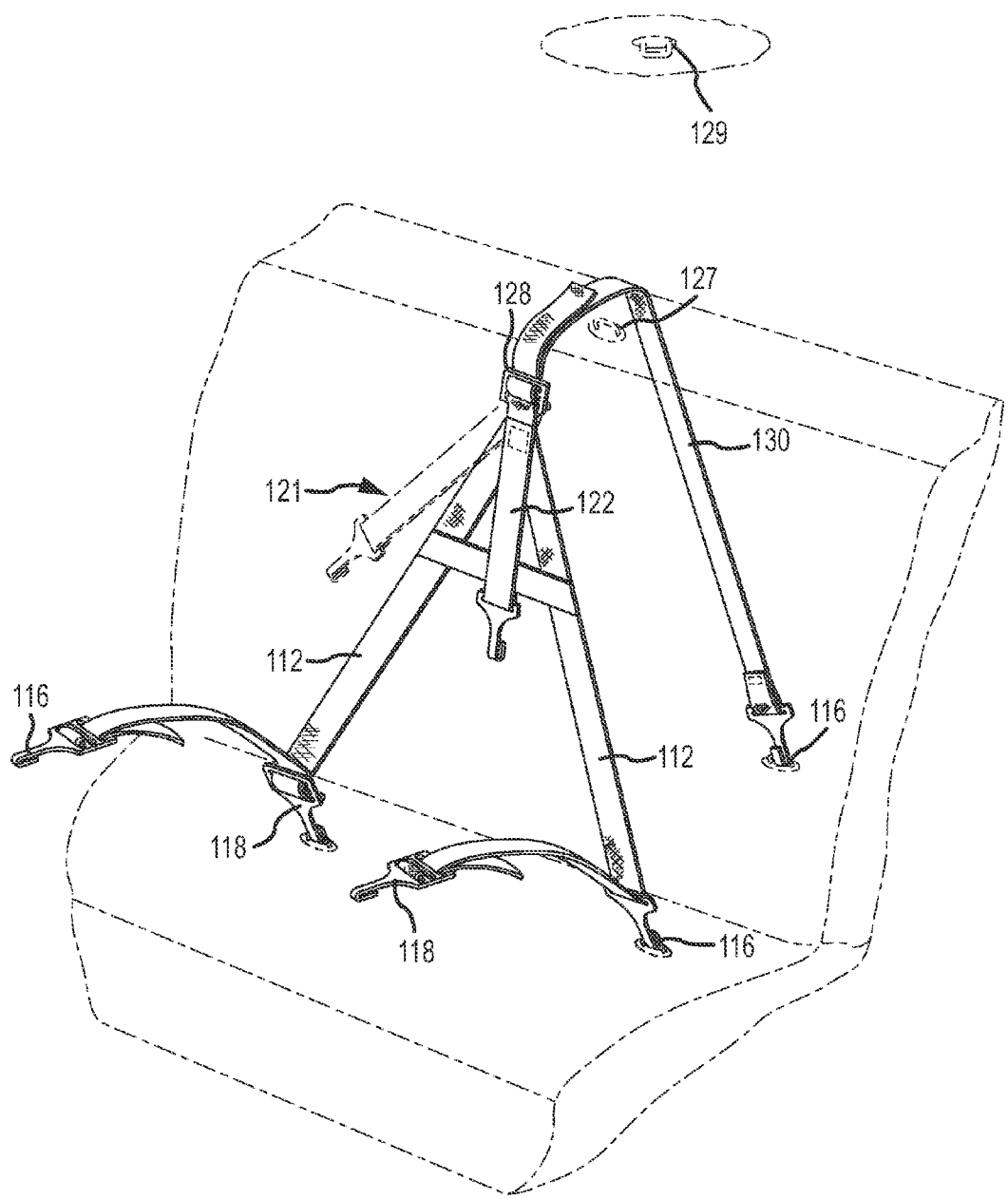
FIG. 3 is an isometric view of the pet restraint system of FIG. 1 with the dog removed.

FIGS. 1 and 2 illustrate a first embodiment of a pet restraint system 100 installed in a seatback 113 of a vehicle to secure a pet, e.g., a dog 119 to the seatback 113. FIG. 3 illustrates the first embodiment of the pet restraint system 100 with the dog 119 removed. The pet restraint system 100 may be used to secure an animal such as the dog 119, a cat or the like, or other objects (e.g., boxes, crates, bags, etc.) to the vehicle. For example, the restraint system 100 could attach in a similar manner to the way illustrated in FIGS. 1 and 2 to a box or crate with anchor hardware or structures.

The pet restraint system 100 includes framework composed of a vertical strap 130 and two lateral or angled straps 112 connected together. The angled straps 112 extend laterally downward from a bottom end of the vertical strap 130. The combination of the vertical strap 130 and the angled straps 112 secures the pet restraint system 100 to the vehicle. Each of the vertical strap 112 and angled straps 130 may be secured to the vehicle at different locations. The system 100 also includes a securing strap 122 which may be used to secure an animal to the system 100. The securing strap 122 may be attached to the vertical strap 130 and/or the angled straps 112. In the embodiment shown in FIGS. 1-3, the securing strap 122 is looped through a tether buckle 128 or similar adjustment device and then fixedly connected with itself and the angled straps at a conjunction of the top ends of the angled straps 112. In this embodiment, the securing strap 122 is sewn to itself as well as the top ends of each of the angled straps 112. In some embodiments, the bottom ends of the angled straps 112 may be threaded through a slide hook 116 that is also used to secure the dog 119 to the system 100.

The vertical strap 130 secures the top of the system 100 to a point on or behind the seatback 113. As illustrated in FIGS. 1-3, the vertical strap 130 may extend over the top of the seat 113 and downwards, connecting to an anchor structure 107 located on the floor of the vehicle. This secures the system 100 vertically, substantially preventing the system 100 from sliding off of the seat 113. The top end of the vertical strap 130 may be operably connected to a slide hook 116 or similar clasp, which connects the vertical strap 130 to a connection location within the vehicle. The connection location may be an anchor structure 107, e.g., in the form of a ring, eye, hook, rung, or similar structure, mounted on the floor of the vehicle behind the seatback 113. In other embodiments, the vertical strap 130 may be secured to a manufacturer anchor structure 127 mounted on the top of the seatback 113 or to a manufacturer anchor structure 129 mounted on the ceiling of the vehicle as shown in FIG. 3. The location of such anchor structures 107, 127, 129 may depends on the vehicle model or configuration. The vertical strap 130 may either travel over a top surface of the seatback 113 (as shown in FIGS. 1-3), or may have little or no contact with the top surface of the seatback 113 (e.g., if the vertical strap 130 is secured to the anchor structure 129 located on the roof). In any embodiment, the vertical strap 130 secures the system 100 to a portion of the vehicle.

Figure 13:
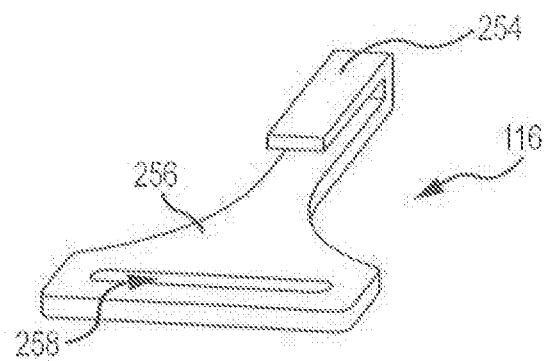
FIG. 13 is an isometric view of a first embodiment of a latch hook that may be used with the pet restraint system and/or the harness.
Figure 14:
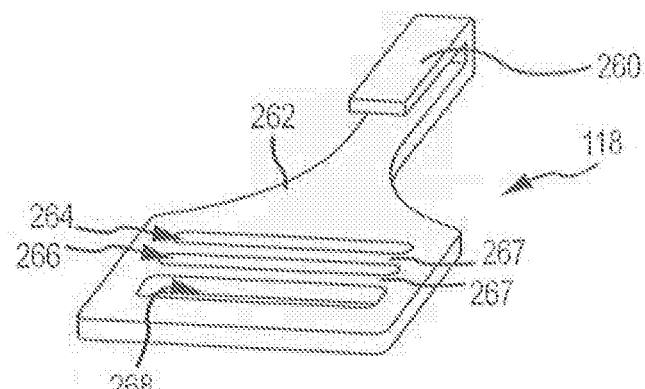
FIG. 14 is an isometric view of a second embodiment of a latch hook that may be used with the pet restraint system and/or the harness.

In some embodiments, the slide hook 116 is threaded or looped on the end of the vertical strap 130. Exemplary embodiments of such slide hooks are shown in greater detail in FIGS. 13 and 14, which are described in greater detail herein below. In the embodiment shown in FIGS. 1-3, a slide hook 116 with a single slot as shown in FIG. 13 is used and the vertical strap 130 is looped through the slot and sewn to itself to permanently couple the slide hook 116 to the loop in the vertical strap 130. In other embodiments, a buckle hook 118 as shown in FIG. 14 may instead be used to adjustably couple the vertical strap 130 to the buckle hook 118, allowing the user to shorten or lengthen the vertical strap 130 from this location and thus adjusting the vertical position of the vertical strap 130 on the seatback 113. Adjusting the vertical strap 130 may also increase or decrease the tension on the vertical strap 130.

In other embodiments, as shown in FIG. 1, adjustment of the length of the vertical strap 130 may be provided at other locations. For example, the bottom end of the vertical strap 130 may be threaded through the slots in the tether buckle 128. The position of the tether buckle 128 may be adjusted on the vertical strap 130 to extend or shorten the length of the vertical strap 130 and thus alter the position of the vertical strap 130 with respect to the seatback 113. The position of the tether buckle 128 may be adjusted to reduce slack by shortening the length of the vertical strap 130 between the tether buckle 128 and the anchor structure 107 in the vehicle.

The top ends of the two angled straps 112 are fixedly connected to each other and to the securing strap 122 at an attachment point 111. The two angled straps 112 are angled downwards from the attachment point 111 and laterally apart from each other. The angled straps 112 provide horizontal strength and support for the system 100 along the seat 113. The two angled straps 112 travel down a front portion of the seat 113 and then may be secured to the vehicle. For example, a slide hook 116 may be threaded on the angled straps 112 to secure to anchor structures 115 (e.g., rings, loops, eyes, clips, or hooks) in a crease or bight 104 in the seat 102 at the intersection between the seatback 113 and the bottom cushion 117 and/or in other locations. Such anchor structures 115 are provided in the seat bight 104 primarily for the purpose of securing a child safety seat in the vehicle.

Each slide hook 116 may slideably engage the angled strap 112 at an intermediate location along the length of each angled strap 112. The slide hook 116 may have a single slot as depicted in FIG. 13 through which the angled strap 112 freely slides as shown in FIGS. 1 and 2. Alternatively, the buckle hook 118 of FIG. 14 with three slots may be used to prevent the angled straps 112 from freely slipping (if properly threaded), thereby allowing the angled straps 112 to be secured tightly against the seatback 113 by similarly placing tension on the vertical strap 130 that is fixed to an anchor structure 107 at its top end. The slide hook 116 thus secures the angled straps 112 to the seat 102.

Once the slide hooks 116 are connected to the anchor structures 115 through the bight 104 in the seat 113, the free ends of the angled straps 112 then may extend outward through bight 104. The free, lower ends of the angled straps 112 may then be secured to respective slide hooks 118 for attaching to the dog 119, thereby securing the dog 119 to the system 100. In this implementation, the angled straps 112 slip freely through the slots in the slide hooks 116, but the angled straps 112 will generally remain under tension as the pet 119 tends to pull against the angled straps 112 when attached and otherwise will pull against them during a sudden stop of the vehicle.

Alternatively, in some embodiments each angled strap 112 may be formed of two separate straps. For example, a first strap may connect the pet restraint system 100 to the vehicle via a slide hook connected with an anchor structure 115 in the seat bight 104, and a second strap may connect from the anchor hook in the seat bight 104 to the pet.

A spacer strap 114 may additionally be fixedly connected between the angled straps 112 at a distance below the attachment point 111. The spacer strap 114 helps maintain the lateral separation distance and desired downward angle of the angled straps 112 in order to direct the angled straps 112 toward the anchor structures 115 concealed within the seat bight 104. The spacer strap 114 thereby also provides additional support and structure to the two angled straps 112. For example, the spacer strap 114 prevents the angled straps 112 from sliding horizontally along the seat 113 away from each other. However, in some embodiments, the spacer strap 114 may be omitted.

The buckle hook 118 is similar to the slide hook 116 as it includes a hook, clasp, or similar structure which may be operably connected to a ring, eye, hook, or similar structure on a collar or harness on the pet 119. However, instead of one slot, the buckle hook 118 has three slots to allow the angled straps 112 to be held tightly in a fixed position while still enabling the adjustment of length of the angled straps 112. This flexibility allows the angled straps 112 to better fit a variety of vehicles seats and/or animals. For example, some vehicle seats may have a larger back portion of the seat and, in these cases, the angled straps 112 may be lengthened to allow the straps 112 to secure into the seat bight and still secure to the dog 119. Further, the buckle hook 118 allows the restraint system 100 to be used with animals of different sizes and also allows the owner to provide the animal 119 with greater or lesser freedom to change positions while secured to the system 100.

In some embodiments, the buckle hooks 118 on the angled straps 112 may be substituted for slide hooks 116. This exemplary configuration is shown in FIG. 3 with the left angled strap 112 having two buckle hooks 118. One buckle hook 118 secures the angled strap 112 to the vehicle, while the other buckle hook 118 may be used to secure the dog 119 to the pet restraint system 100. In this embodiment, the pet restraint system 100 may be tightly fastened against the seatback 113 and further allow for adjustment of the length of the angled strap 112 for connection to the dog 119. This may be used to enlarge or reduce the range of movement for the dog 119 or to fit different sized pets for connection to the pet restraint system 100.

A securing strap 122 is connected to the tether buckle 128 and extends downward from the tether buckle 128 for use in securing the dog 119 (or animal/object) to the system 100. In the embodiment depicted in FIGS. 1-3, the securing strap 122 is threaded through a slot in the tether buckle 128 and the top end is then fixed (e.g., by sewing) to an intermediate location of the securing strap 122 to form a fixed loop connection with the tether buckle 128. The securing strap 122 may be a relatively short strap as compared to the angled straps 112 and/or vertical strap 130. The securing strap 122 may be fixed to the top ends of the two angled straps 112 at an attachment point 111 below the tether buckle 128. In the embodiment of FIGS. 1-3, the same stitching used to form the loop in the securing strap 122 may additionally be used to attach the angled straps 112 to the securing strap 122. The loop connection of the securing strap 122 with the tether buckle 128 provides the connection between the angled straps 112 and the vertical strap 130. Alternatively, the vertical strap 130 and the securing strap 122 may be connected in other ways or locations, or the vertical strap 130 may be connected directly to the angled straps 112 and not to the securing strap 122 at all.

The two angled straps 112 and/or the spacer strap 114 may be attached to the securing strap 122 via stitching, staples, glue, clasps, or in any other appropriate manner that provides the necessary connection strength between the angled straps 112 and the securing strap 122. In some embodiments, the securing strap 122 may be an extension of the vertical strap 130. In other embodiments, such as the embodiment illustrated in FIGS. 1-3, the securing strap 122 may be a separate strap from the vertical strap 130. In the embodiment illustrated in FIGS. 1-3, there may be three straps secured at an attachment point 111 below the tether belt 128. This embodiment, the singular attachment point 111 for the securing strap 122 and the angled straps 112 provides strength and support for all of the straps 112, 122. However, there may be other configurations. For example, an additional securing strap 121 as shown in FIG. 3 may also be connected at the attachment point 111 or other location for use in securing a second animal. In such an implementation, one of the angled straps 112 may be attached to one of the animals and the second angled strap 112 may be attached to the second animal. Additionally or alternatively, the angled straps 112 and/or the securing strap 122 may be connected in other configurations or may not be connected to each other.

In the embodiment illustrated in FIGS. 1-3, the securing strap 122 loops around a slide hook 116 at its free end. The slide hook 116 connects the securing strap 122 to a collar, harness 200, or other location on the dog 119 and/or object. As shown, the slide hook 116 may be secured within a fixed loop formed within the free end of the securing strap 122, e.g., by sewing the end of the securing strap 122 to an intermediate location on the securing strap 122 after it loops through the slide hook 116. By using fixed connections on each end of the securing strap 122, the securing strap 122 is provided in a single, fixed length. This may help ensure that the animal 119 is positioned appropriately in the seat and is adequately restrained from interfering with the driver. Adjustment for various sizes of animals may be made by raising or lowering the vertical position of the attachment point by changing the lengths of the vertical strap 130 and the angled straps 112. In an alternative embodiment, the securing strap 122 may be adjustable through the use of a buckle hook 118 to accommodate different breeds and/or sizes of animals.

As shown in FIGS. 1 and 2, the dog 119 is secured by three straps, the securing strap 122, and the two angled straps 112. In some implementations there may be additional straps used to secure the animal to the system 100 (e.g., securing strap 121). This helps to prevent the dog 119 from substantially moving around while secured to the system 100, either on its own or due to movements of the vehicle.

In some implementations the vertical strap 130, the angled straps 122, and the securing strap 122 may be made of the same material or different material from each other. The straps 112, 122, 130 may be made of woven fabric belting, e.g., a woven nylon as used for seatbelts for vehicles or straps for packs or tie-down belts. This material allows for the restraint system 100 to be strong, while additionally being lightweight and movable. For example, the restraint system 100 may be easily stored in a bag or packed in a drawer, purse, box, etc., as the straps 112, 122, 130 may compress into a small volume. However, the straps 112, 122, 130 may be made out of any strong flexible fabric, rope, cable or the like.

Furthermore, the straps 112, 122, 130 allow the restraint system 100 to easily adjust, accommodating a variety of vehicle seat sizes, as well as animal breeds and sizes. This is because the length of the straps 112, 122, 130 may be provided in a variety of sizes and/or adjustment mechanisms, e.g., buckle hook 118 and tether buckles 128, may be provided to allow for adjustment of each of the straps 112, 122, 130. In some implementations, all of the straps 112, 122, 130 may be configured to be adjustable. Further, although the straps 112, 122, 130 may be illustrated with a particular adjustment device, any suitable adjustment device may be used.

The hooks 116, 118 may be configured to quickly release from the attachment points in the vehicle and from attachment to the animal 119. The quick release feature allows the system 100 quickly release the animal, as well as be easily moved from one vehicle to another. Other attachment devices may be substituted for both the slide hook 116 and the buckle hook 118, for example, swivel hooks, clasps, carabineers, shackles, or other similar hardware to operably attach to rings, hooks, or other attachment hardware in the vehicle or on the animal 119. In some embodiments, the hooks 116, 118 may include a flexible bar closing the hook. The flexible bar may be easily deformed inwards (towards the crook of the hook), opening a passage for connecting the hook to a bar or ring and then closing the hook around the ring when released. Additionally, although the slide hooks 116 and the buckle hooks 118 have been illustrated herein, other securing mechanisms may be used either in combination with the slide hooks 116 and/or buckle hooks 118. For example, the vertical strap 130 may use hooks as the slide hook 116, while the angled straps 112 may include carabineer clasps as their securing devices 116 at the free ends.

Figure 4:
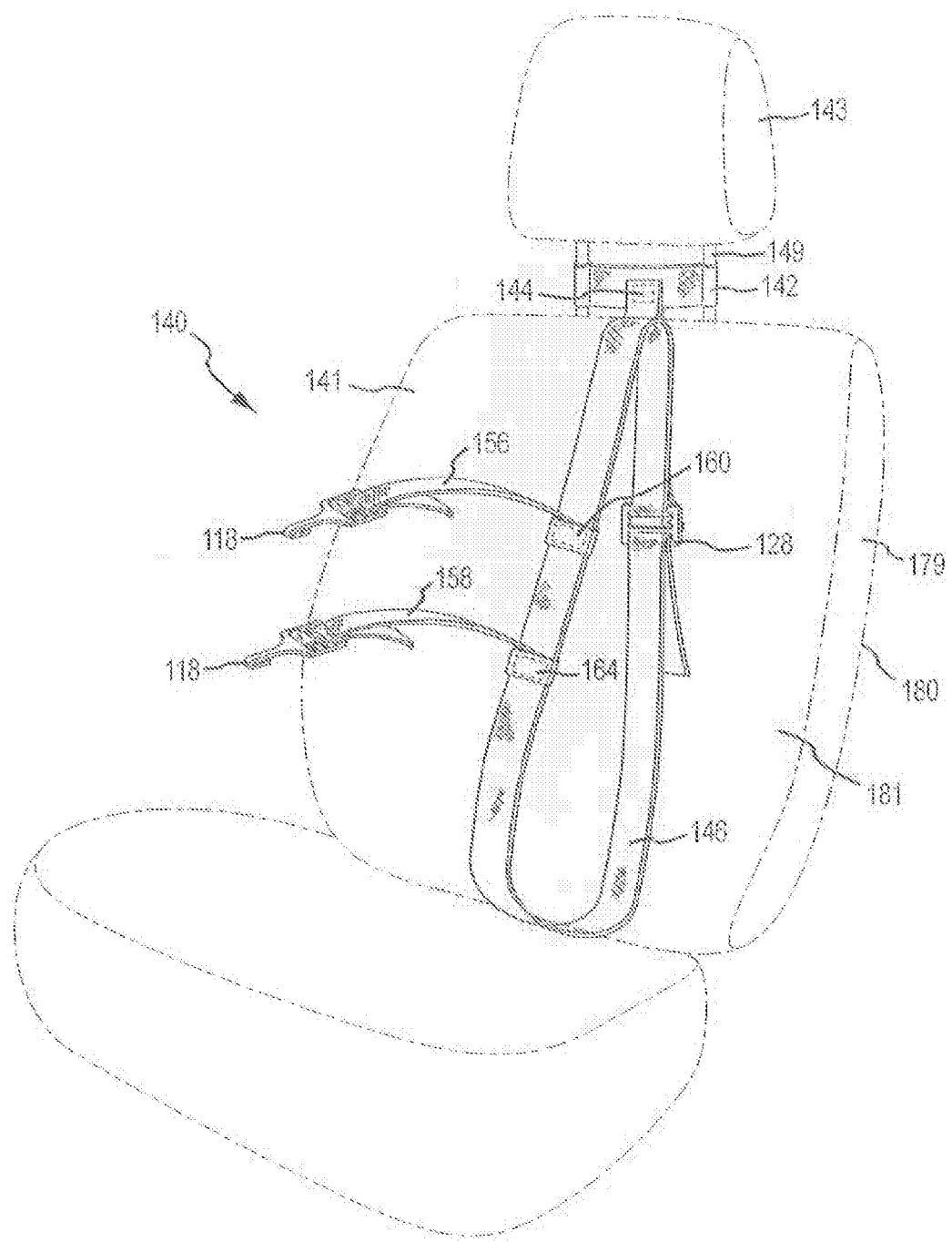
FIG. 4 is an isometric view of a second embodiment of the pet restraint system framework installed on a bucket seat of a vehicle having a removable headrest.

Another embodiment of the pet restraint system 140 is depicted in FIG. 4 and is configured for installation to a front seat or other single, bucket-type seat 180 (e.g., a middle seat in a minivan) with a headrest 143 in a vehicle. In this embodiment, a vertical strap 146 extends along the front of the seatback 181 and over the top 141 of the seat 180, underneath the headrest 143. The two ends of the vertical strap 146 may be held together by a tether buckle 128 that may be used to adjust the total length of the vertical strap 146 and tighten the vertical strap 146 around the seatback 181. As shown in FIG. 4, the tether buckle 128 is positioned on the back side of the seatback 181. However, the tether buckle 128 may be positioned anywhere along the seatback 181 for ease of access.

The tether buckle 128 tightens the vertical strap 146 against the seat 180, so that the system 140 may not substantially move. This secures the vertical strap 146 to the seat, as it may wrap around the entire cushion of the seatback 181 and be tightened. In other embodiments, the vertical strap 146 may be fixed to an anchor point (e.g., an attachment ring or support bar for the seat 180) under the front seat 180.

In some embodiments, the vertical strap 146 may be secured at the top 141 of the seatback 181 to the headrest 143 to prevent the vertical strap 146 from drifting or slipping around the seatback 181 and out of optimal position for securing a pet. For vehicles that have a removable headrest 143, the vertical strap 146 may have a tab 144 that is affixed to a horizontal securing element such as a post strap 142 that attaches to the posts 149 of the headrest 143. For example, as shown in FIG. 4, the post strap 142 may define looped segments on each lateral end configured to receive one of the headrest posts 149. The headrest posts 149 pass through the loops in the post strap 142 and when the headrest 143 is secured in place in the seatback 181, the post strap 142 is secured in place on top 141 of the seatback 181 and prevents the vertical strap 146 from rotating around the seatback 181. In this manner, the pet restraint system 146 is substantially secured in the vertical direction. In other embodiments in which the vertical strap 146 is connected to an attachment structure in the vehicle, the post strap 142 may not be necessary to prevent such vertical rotation.

Two restraining straps 156, 158 are attached to the vertical strap 146 at two restraining attachment points 160, 164, respectively, spaced apart along the length of the vertical strap 146 and positioned on the front of the seatback 181. The restraining straps 156, 158 may be configured similar to the securing strap 122, and secure an animal to the restraint system 140 at at least two points. The restraining straps 156, 158 are secured to the vertical strap 146 at the attachment points 160, 164, for example, by sewing the restraining straps 156, 158 to the vertical strap 146 at these locations. Other methods of attachment, e.g., adhesive, staples, clasps, or other hardware may be used.

The restraining straps 156, 158 may be configured to be secured to a pet via buckle hooks 118. Additionally, the buckle hooks 118 (as with the first embodiment of the system 100) also allow the restraining straps 156, 158 to be adjusted. The buckle hooks 118 may be used to increase or decrease the length of each restraining strap 156, 158, allowing the restraint system 140 to accommodate a variety of different animal sizes. In these embodiments, the top restraining strap 156 may restrain a top portion of the animal and the bottom restraining strap 158 may restrain a bottom portion of the animal.

Figure 5:
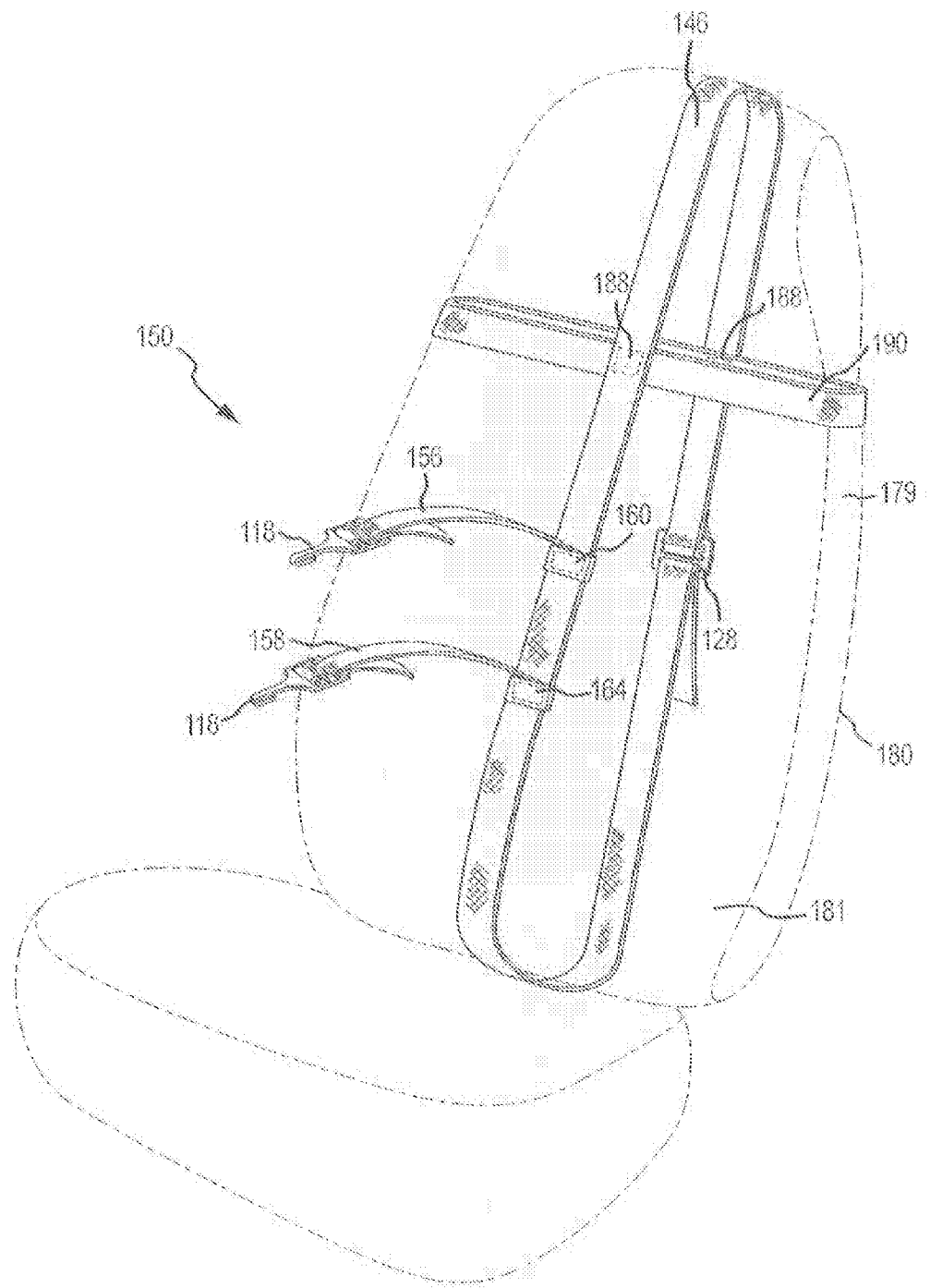
FIG. 5 is an isometric view of a third embodiment of the pet restraint system framework installed on a bucket seat of a vehicle having a continuous seatback.

Another embodiment of the pet restraint system 150 is shown in FIG. 5. This embodiment may be used in conjunction with a bucket seat 180 that does not have a removable headrest. In these embodiments a horizontal securing element such as a horizontal strap 190 may be used to reduce the likelihood of rotation of the vertical strap 146 around the seatback 181. The vertical strap 146 may extend over the top of the seatback and 181 under the seatback 181 through the bight. The ends of the vertical strap 146 may be held together by a tether buckle 128 that may be used to adjust the total length of the vertical strap 146 and tighten the vertical strap 146 around the seatback 181. In another embodiment, the vertical strap 146 may additionally include a slide hook or clip to secure the strap 146 to an attachment structure on the floor of the vehicle or underneath the seat 180 on the seat frame.

The vertical strap 146 may be attached to the horizontal strap 190 at attachment points 188 to a headrest strap 190. The horizontal strap 190 may be a continuous loop and extend around the sides 179 of the seatback 181 to fit snugly in a position in which the perimeter of the seatback 181 is the same as the circumference of the horizontal strap 190. In an alternate embodiment (not shown), the horizontal strap 190 may have two ends that are held together by a tether buckle 128 in a similar manner to the vertical strap 146 as described above, thereby allowing the horizontal strap to be tightened about any part of the seatback 181.

Two restraining straps 156, 158 are attached to the vertical strap 146 at two restraining attachment points 160, 164, respectively, spaced apart along the length of the vertical strap 146 and positioned on the front of the seatback 181. The restraining straps 156, 158 may be configured similar to the securing strap 122, and secure an animal to the restraint system 150 at at least two points. The restraining straps 156, 158 are secured to the vertical strap 146 at the attachment points 160, 164, for example, by sewing the restraining straps 156, 158 to the vertical strap 146 at these locations. Other methods of attachment, e.g., adhesive, staples, clasps, or other hardware may be used.

The restraining straps 156, 158 may be configured to be secured to a pet via buckle hooks 118. Additionally, the buckle hooks 118 (as with the first embodiment of the system 100) also allow the restraining straps 156, 158 to be adjusted. The buckle hooks 118 may be used to increase or decrease the length of each restraining strap 150, 158, allowing the restraint system 150 to accommodate a variety of different animal sizes. In these embodiments, the top restraining strap 156 may restrain a top portion of the animal and the bottom restraining strap 158 may restrain a bottom portion of the animal.

Figure 6:
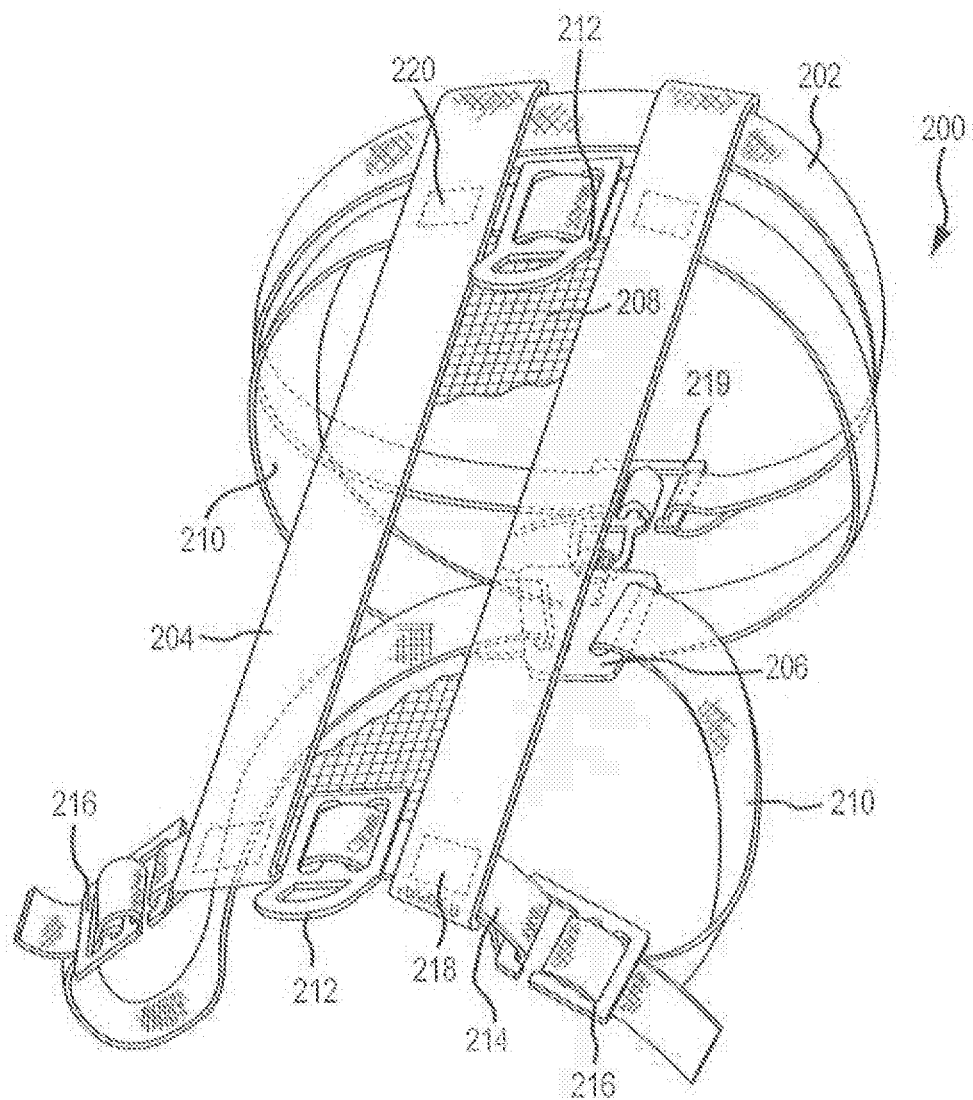
FIG. 6 is a top isometric view of a harness that may be used in combination with the pet restraint system depicting the front of the harness oriented toward the top of the page.

FIG. 6 illustrates an implementation of a harness 200, also shown on the dog 119 in FIGS. 1 and 2, that may be used in conjunction with the pet restraint system embodiments 100, 140, 150 described above. The harness 200 may be configured to wrap around the body of the pet 119. The harness 200 may be adjustable to accommodate a variety of animal types, sizes as well as breeds. Additionally, the harness 200 may be made in a variety of sizes (e.g., small, medium, and large) using a variety of widths/strengths of belting to accommodate various animal sizes and weights while still adhering to the same basic design. The harness 200 may include a collar 202, chest belts 210, back straps 204, and various pieces of hardware 206, 212, 216. The collar 202 and chest belts 210 wrap around portions of the animal 119 and the back straps 204 rest along the back of the animal 119. For example, as shown in FIG. 1, the back straps 204 run along the back of the dog 119. As shown in FIG. 2, the chest straps 210 wrap around the neck and the chest of the dog 119.

The collar 202 may wrap around a neck area of the animal 119, e.g., as shown in FIG. 2. The ends of the collar 202 may be held together using a collar buckle 219. On end of the collar 202 may be formed as a closed loop threaded through a slot in the collar buckle 219 that has an opening along one edge that allows for quick release of the loop. The other end of the collar 202 may be threaded through slots in the collar buckle 219 to provide generally fixed, but adjustable, attachment. The configuration of an exemplary collar buckle is presented below in the description of FIG. 15.

The collar 202 may also be operably connected to the chest straps 210 via the collar buckle 219. The collar buckle 219 includes a ring portion 270 that connects with a hook portion of 222 of a chest hook 206 operably connected to the chest straps 210 as further described below. Thus, the collar 202 may position a portion of the chest straps 210 at the animal's chest and prevent the harness 200 from sliding downwards and/or out of a desired position on the animal. For example, as shown in FIG. 2, the collar buckle 219 is attached to the chest hook 206 which supports the chest straps 210 and positions the chest straps 210 at the chest of the dog 119.

The collar 202 is also operably connected to the back straps 204. The collar 202 may be threaded through a loop at a first end of each of the back straps 204. In other embodiments, the collar 202 may be fixedly attached via stitching, staples, adhesive, or the like to the back straps 204.

The back straps 204 run along a backside of the animal. The back straps 204 provide support and/or a connection location for the collar 202 and the chest straps 2010. The back straps 204 may be operably connected together via a web 208 of material. The back straps 204 are also affixed to the chest straps 210 at a front location 220. The front location 220 is near the animal's head when the hardness 200 is inserted around the animal. The back straps 220 are then fixedly connected to a connector strap 214 at a back location 218. The back location 218 is near the animal's rear when inserted into the harness 200. The back location 218 and the forward location 220 may secure a portion of each back strap 204 to itself, creating a loop. In some implementations, the two back straps 204 may be secured to the themselves and the collar 202 may be threaded through the loop created. This then connects the collar 202 to the back straps 204 and holds the back straps 204 in position on the back of the animal.

The web 208 connects the two back straps 204 together. The web 208 may be constructed out of mesh, fabric, foam, or any flexible fabric. Additionally, the web 208 may include support structures, such as belting, wires, etc., to provide additional support and strength to the material. For example, if the fabric is weak (e.g., loose mesh), extra support straps/belts may be sewn into the web 208 providing additional strength.

The chest straps 210 wrap partially around an animal's back and then inserted behind the front legs of the animal. After being inserted behind the front legs, the chest straps 210 are threaded through a chest hook 206. The chest hook 206 may be located at or near the animal's chest and is operably connected to the collar 202. After exiting the chest hook 206, the chest 210 straps exit and travel up the animal's stomach to connected with the connector strap 214. In this embodiment, the chest straps 210 remain on a single side. In other words, the chest straps 210 are threaded behind the animal's front legs and then connected to the connector strap 214 near the back legs of the animal on the same side.

In some embodiments, as shown, the chest straps 210 may be a single strap that is threaded through around an animal's body via connectors. However, in other embodiments, the chest straps 210 may be separate straps operably connected together. For example, one strap may wrap around a shoulder of the animal and then connect to a second strap that may wrap around the chest of the animal.

A securing ring 212 may be threaded on the chest strap 210 between the two back straps 204. Similarly, a securing ring 212 may also be threaded on the connector strap 214 between the two back straps 204. The securing ring 212 may be used to secure the animal to the securing strap 122, the angled straps 112, the restraining straps 150, 158 or the like.

The connector strap 214 may be operably connected to the chest straps 210 via a quick-release buckle 216. The quick-release buckle 216 may secure the chest straps 210 to the connector strap 214, but also allows the connector strap 214 to easily slide off. These embodiments allow a user to quickly and easily remove the animal from the harness 200. For example, rather than sliding the collar 202 and chest straps 210 off the animal, the user simply slides the connector strap 214 off the quick-release buckle 216. Once the connector strap 214 is disconnected the harness 200 may be slid over the animal's head, without disconnecting other straps and/or connectors.

The collar 202, the chest belt 210, the connector strap 214 and the back straps 204 may be adjustable, allowing the harness 200 to expand as the animal grows, or be able to be used with different animals. For example, adjustment connectors/clasps may be included along the length of any of the straps. The collar 202, chest belt 210, connector strap 214, and back straps 204 may be made of a strong, woven fabric, for example, a woven belt material, or other materials including cables, rope, or extruded materials with high tensile strength.

FIGS. 1 and 2 illustrate the pet restraint system 100 attached to a dog 119 via the harness 200. The dog 119 may be secured to the seat 102 via the pet restraint system 100. The harness 200 fits over the dog's 119 body and the slide hooks 116 and/or buckle hooks 118 of the restraint system 100 are secured to the harness 200. For example, the slide hook 116 operably connected to the securing strap 122 may be connected to the securing ring 212 on the front of the harness 200.

As can be seen from the FIGS. 1 and 2, the system 100 may be configured to allow the dog 119 some movement, but substantially prevents large movements forwards or sideways. Essentially, the dog 119 is prevented from moving farther than the length of the angled straps 112 and/or the securing strap 122. This prevents the dog 119 from being thrown throughout the vehicle in the event or an accident or sudden movement/stopping.

Figure 7:
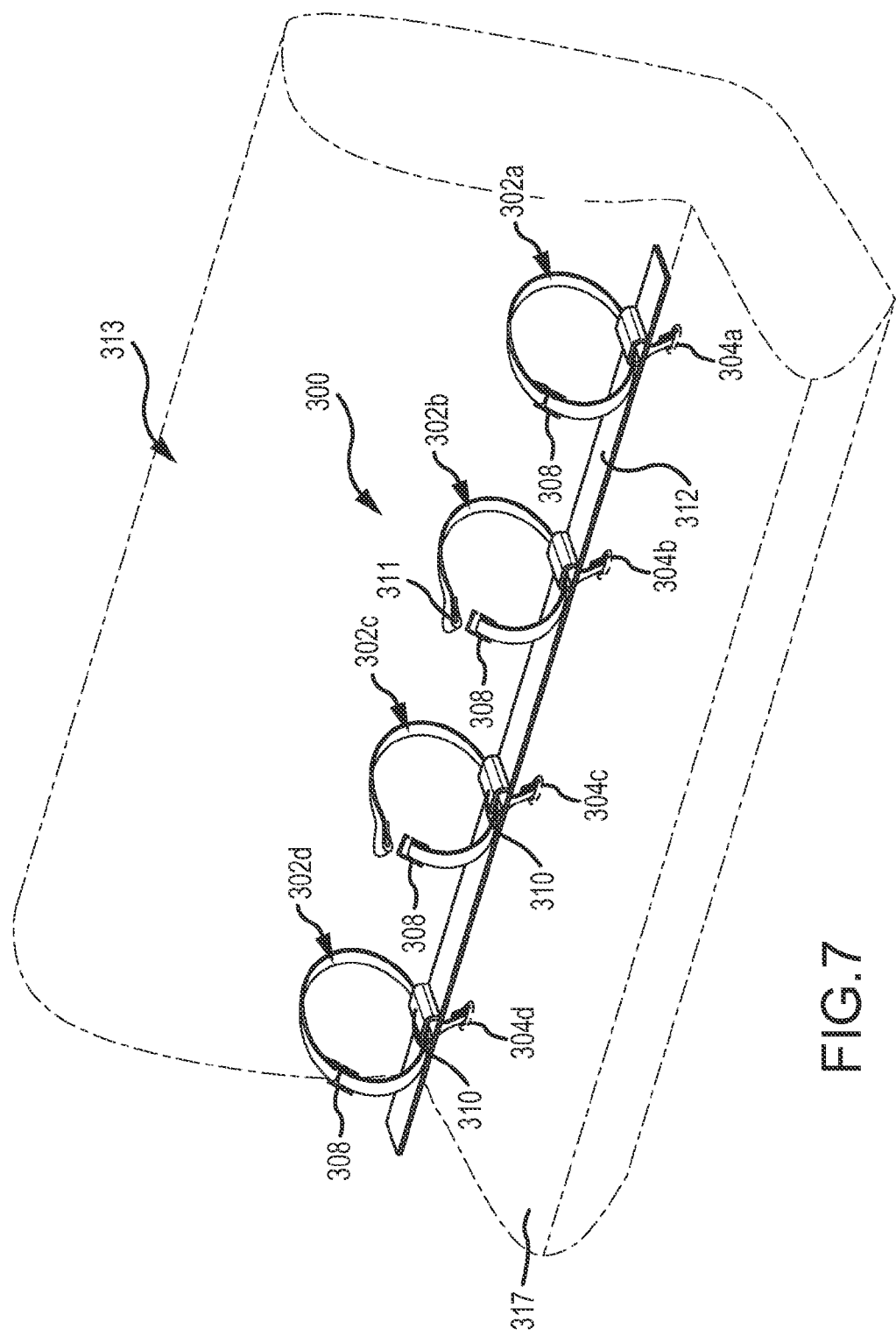
FIG. 7 is a front isometric view of a fourth embodiment of a pet restraint system installed on a back seat of a vehicle.

FIG. 7 illustrates another embodiment of the pet restraint device. In this embodiment, the pet restraint system 300 may be used with a bench seat. The pet restraining device 300 may be used to secure multiple animals or secure a single animal at different points along its body. The pet restraint system 300 includes a seat strap 312, securing straps 302a-302d, slide hooks 304a-304d, and attachment straps 310. The seat strap 312 rests along an upper surface of the bottom seat cushion 317 and is secured to manufacturer attachment structures in the bight 307 of the seat 313 via the slide hooks 304a-304d. The slide hooks 304a-304d may be substantially similar to slide hook 116 and/or buckle hook 118, illustrated in FIGS. 1-3. In some embodiments, the seat strap 312 may run the entire length of the seat 313 and be substantially flush against the bottom cushion 317. The seat strap 312 is secured in multiple connections via the slide hooks 304a-304d.

The seat strap 312 is operably connected to one or more securing straps 302a-302d. The securing straps 302a-302d may either wrap around the seat strap 312 or may be attached to the seat strap 312 via attachment straps 310. In either embodiment, the securing straps 302a-302d may wrap around a portion of an animal's (or object's) body. The ends of the securing straps 302a-302d are attached to quick release buckles 308 and are adjustable threaded at a first end and attached in an open slot via a loop 311 or other connection mechanism at a second end. The loop 311 may be used to quickly attach and release the securing straps 302a-302d around the animal while the other end of the straps securing straps 302a-302d may be adjusted for length. In one exemplary implementation, the first securing strap 302a may wrap around a dog's torso directly behind its front legs and the second securing strap 302b may wrap around the dog's torso directly in front of its back legs. In these embodiments the dog may be secured in two locations.

In other embodiments, a single securing strap 302a-302d may be used separately to secure an animal to the seat 313. This may allow multiple animals (or objects) to be secured via the pet restraint system 300. For example, the first securing strap 302a may be used to wrap around the body of a first dog, and the third securing strap 302c may be used to wrap around the body of a second dog.

Figure 8:
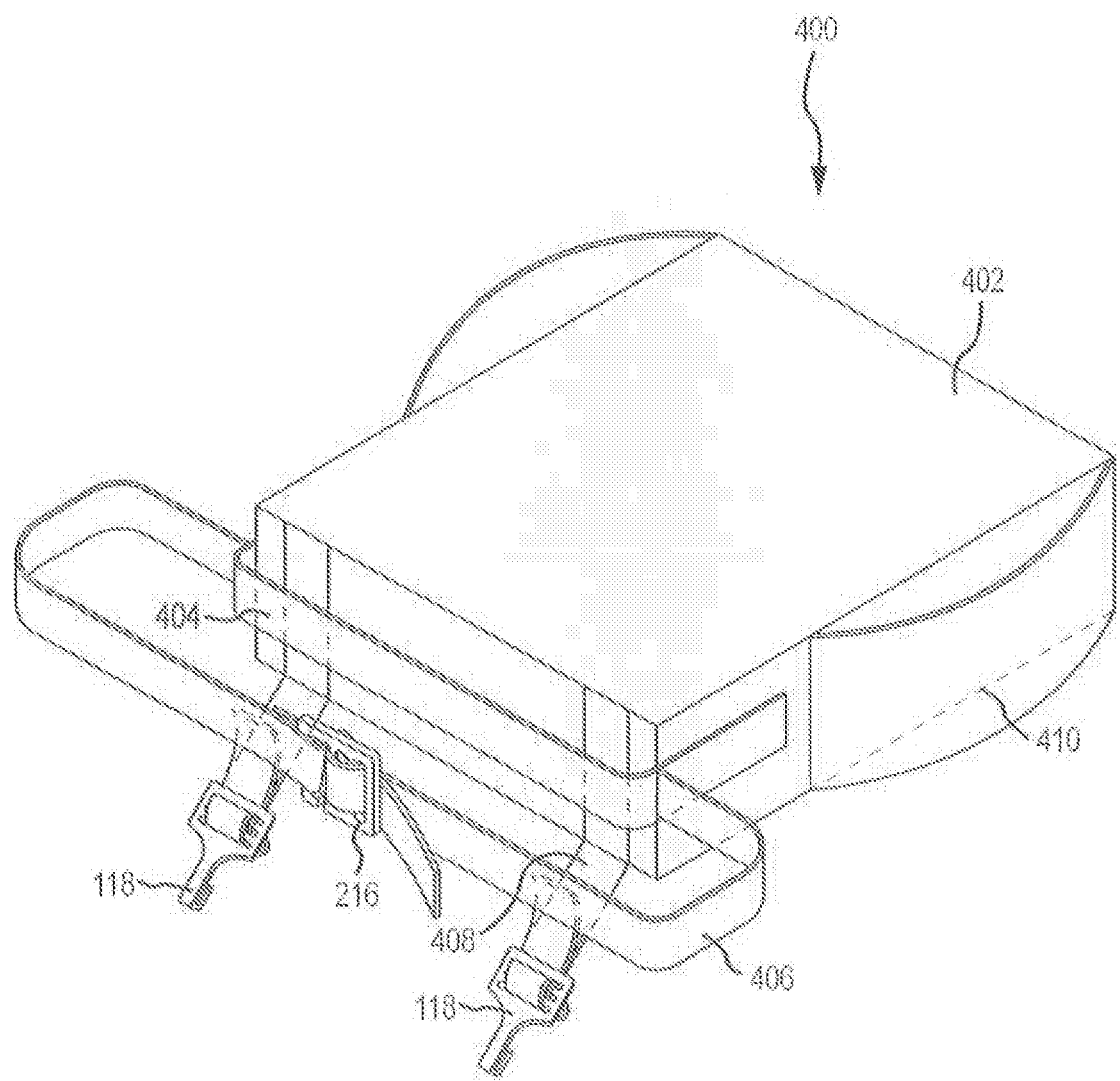
FIG. 8 is a rear isometric view of a booster that may be used in combination with the pet restraint system.

FIG. 8 illustrates a booster seat 400 to be used with the pet restraint system for animals that are small and raise their bodies off the seat, for example, to allow the animal to see out the window or have a better view within the car. Thus, the booster 400 may prevent some animals from getting motion sickness or the like. The booster 400 includes a seat cushion 402 that lifts the animal up from the vehicle seat. The cushion 402 may have a foam core and be wrapped with a fabric, mesh, or other material. In these embodiments, the booster 400 may also provide a comfortable place for the animal to rest. The cushion 402 may be secured to the seat and/or pet restraint system by a booster strap 404. The booster strap 404 may extend snugly around the back side of the cushion 402 and be secured to either a seatbelt within the vehicle or the straps of the pet restraint systems 100, 140, 150 that may be slipped between the booster strap 404 and the cushion 402. In some embodiments, the booster strap 404 may be sewn onto the cushion 402, or it may be wrapped around the cushion 402.

In some embodiments, an extended booster strap 406 may extend out from the cushion 402 and wrap around a seatback in the vehicle. The ends of the extended booster strap 406 may be connected together with a quick release buckle 216, a tether buckle (not shown), or any other appropriate connector that allows the length of the extended booster strap 406 to be adjusted and to tighten around the seatback. Further or alternatively, the booster 400 may also include bight straps 408 with buckle hooks 118 extending from the back of the cushion 402 to secure the booster 400 to a manufacturer attachment structure within the seat bight. Additionally or alternatively, the booster 400 may include seatbelt straps 410. The seatbelt straps 410 may be connected along the sides of the booster cushion 402. A seatbelt within the vehicle may be threaded through the seatbelt straps 410 and secured. This may secure the booster 400 on the seat within the vehicle.

FIGS. 9A-15 illustrate a variety of hardware latches, i.e., clips, clasps, hooks, buckles, rings, slides, and other attachment, connection, and adjustment devices that may be used with any of the above pet restraint embodiments and/or the harness 200. The hardware latches illustrated are just a few embodiments that may be used with the pet restraint device and harness 200, and other devices may also be used. Further, although the pet restraint device embodiments and harness 200 have been illustrated with particular hardware latches, any of the connecting devices illustrated in FIGS. 9A-15 may be used instead as appropriate. In addition, other types of hardware latches not illustrated may also be used. Furthermore, the hardware latches illustrated may be constructed out of durable materials, such as metal, alloys, plastic and the like.

Figure 9A:
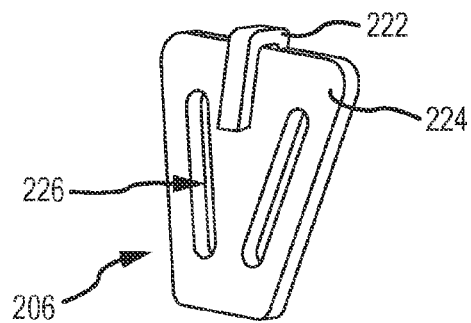
FIG. 9A is an isometric view of a first connector that may be used with the pet restraint system and/or the harness.
Figure 9B:
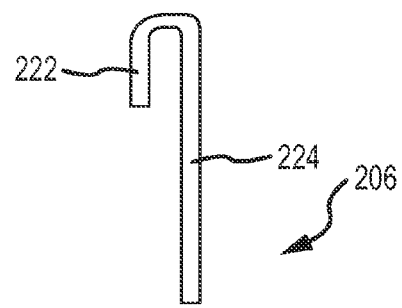
FIG. 9B is a side elevation view of the first connector illustrated in FIG. 9A.

FIGS. 9A and 9B illustrate the chest hook 206 that may be used to secure the collar 202 to the chest straps 210. The chest hook 206 includes a hook 222 operably connected to a top portion of the slider body 224. The slider body 224 defines two angled bar apertures 226. In some embodiments the angled bar apertures 226 may receive the chest strap 210 in through a first side and the chest strap exists the second side of the same angled bar aperture 224. In this embodiment, the angled bar aperture 224 allows the chest strap 210 to change directions along the harness 200. The hook 222 may be used to connect over a portion of the collar 202, securing the collar 202 to the chest straps 210 (see e.g., FIG. 2).

Figure 10:
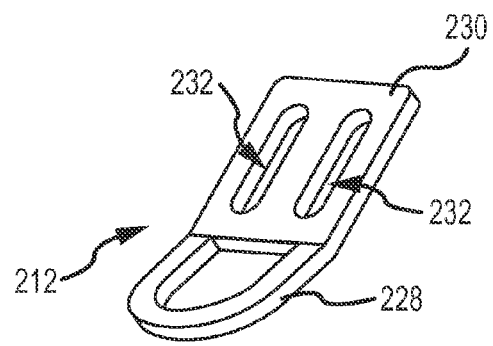
FIG. 10 is an isometric view of a second connector that may be used with the pet restraint system and/or the harness.

FIG. 10 illustrates a securing ring 212 that may be used to secure the harness 200 to the securing strap 122, angled straps 112, or the restraining straps 150, 158. The securing ring 212 may include a main slider body 230 defining two apertures 232 for receiving a strap, e.g., the connector strap 214. The ring 228 may be D-shaped and when attached to the slider body 230 forms a receiving aperture. The ring 228 extends outward from the slider body 230 and upward at a slight angle from the plane of the slider body 230 to provide an easy configuration for attachment that is not against the body of the animal. The slide hooks 116, buckle hooks 118, and other hardware connectors for the pet restraint systems 100, 140, 150 may connect to the D-shaped ring 228.

Figure 11:
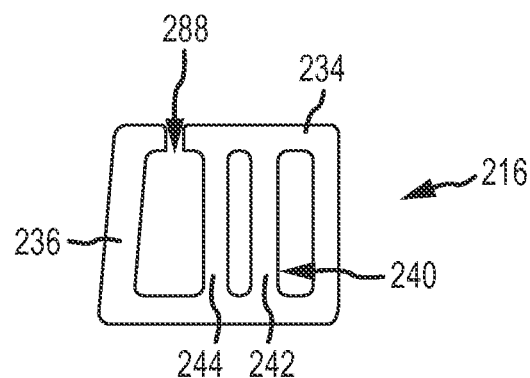
FIG. 11 is a front elevation view of a third connector that may be used with the pet restraint system and/or the harness.

FIG. 11 illustrates the quick-release buckle 216. The quick-release buckle 216 may be used with the harness 200, attaching the connector strap 214 to the chest straps 210. The quick-release buckle 216 may include a slider body 234 that defines two strap-receiving apertures, a narrow slot 241 and a wide slot 240, separated by a median bar 242. The wide slot 240 is capable of easily receiving at least two lengths of straps therethrough. The narrow slot 241 and the wide slot 240 are configured to allow a strap to thread into one and out the other, such that the strap may partially wrap around the median bar 242 and secure the strap to the quick-release buckle 216. The narrow slot 241 and the wide slot 240 also allow the strap length to be adjustable. Thus, the quick-release buckle 216 can be used to secure a strap around the slider body 234.

One side of the quick-release buckle 216 opposite the wide slot 240 defines a catch aperture 237 bounded by an angled bar 236 that is attached at a bottom side to a bottom wall of the body 234 and a straight bar 244 adjacent the narrow slot 241. A strap exit aperture 288 is defined in a top wall of the body 234 between the angled bar 236 and the straight bar 244. The strap exit aperture 288 allows a loop in a connector strap 214 to quickly slide on and off the angled bar 236, allowing the harness 200 to be quickly removed. The pitch of the angled bar 236 with respect to the top and bottom wall of the slide body 234 helps retain the loop of the connector strap 214 within the catch aperture 237 and resists the possibility of the loop sliding off on its own, but rather staying secure until a user slides the connector strap 214 over the angled bar 236 and through the exit aperture 288.

Figure 12:
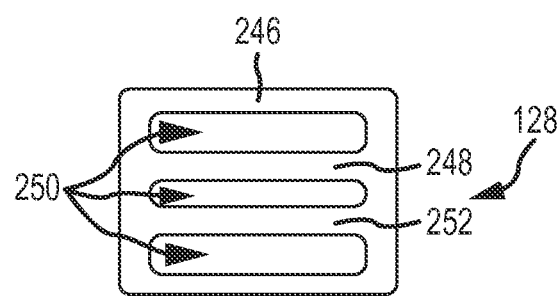
FIG. 12 is a front elevation view of a fourth connector that may be used with the pet restraint system and/or the harness.

FIG. 12 illustrates the tether buckle 128. The tether buckle 128 is formed as a rectangular body 246 that defines strap-receiving apertures in the form of two wide slots 247, 251 bounding each side of a middle, narrow slot 250. The two wide slots 247, 251 are separated from the narrow slot 250 by two strap bars 267. A strap may be threaded through the slots 247, 250, 251 and around the strap bars 248, 252 and may thus be secured in a fixed position. The wide slots may allow for at least two lengths of strap to pass within their aperture. This provides for configurations with a strap having a fixed loop attached to one end of the tether buckle 128 threaded through one of the wide slots 247 and a second strap with a free end threaded through all of the slots 247, 250, 251 for an adjustable connection. The tether buckle 128 allows the strap length to be adjusted by moving more strap material through the slots 247, 250, 251 and around the strap bars 248, 252 to position more or less of the length of the strap on one side of the tether buckle 128 or the other. When a strap is appropriately threaded through the slots 247, 250, 251 and is pulled taut against the strap bars 248, 252, the tether buckle 128 substantially resists movement or slippage of the strap through the slots 247, 250, 251.

FIG. 13 illustrates the slide hook 116 and FIG. 14 illustrates the buckle hook 118. The slide hook 116 and the buckle hook 118 may be substantially similar. The difference between the two may be that the slide hook 116 may only include a single strap receiving aperture 258, whereas the buckle hook 118 may include multiple strap receiving apertures 264, 266, 268.

The slide hook 116 may receive a strap and/or strap loop within the strap-receiving aperture 258 and includes a hook portion 254 to attach the strap to a ring, bar, or other similar structure. The hook portion 254 extends distally from the body 256. The body 256 is formed as a relatively rectangular shape that tapers on one side as it extends to form the hook 254. The strap-receiving aperture 258 is defined within the body 256 as a narrow, substantially rectangular slot oriented transverse to the direction of extension of the hook 254.

The buckle hook 118 has substantially the same shape as the slide hook 116 and defines a hook 260 that extends from the body 262. However, the area of the body 262 is larger and defines strap-receiving apertures in the form of two narrow slots 264, 266 and one wide slot 268. The two narrow slots 264, 266 are separated from each other by a first strap bar 267 and the middle narrow slot 266 and the wide slot are separated by a second strap bar 267. The multiple strap bars 267 function the same as the strap bars 248 on the tether buckle 128, i.e., the strap may be threaded through the slots 264, 266, 268 and around the strap bars 267 and secured in a fixed position.

Figure 15:
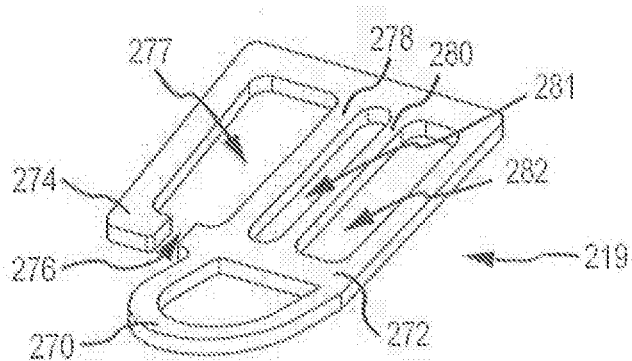
FIG. 15 is an isometric view of a fifth connector that may be used with the pet restraint system and/or harness.

FIG. 15 illustrates the collar buckle 219. The collar buckle 219 includes a main body 272 and a ring 270 extending from a bottom edge thereof. The ring 270 may be "D" shaped and configured to receive a hook, clip, clasp, or the like. The ring 270 extends outward from the main body 272 and upward at a slight angle from the plane of the main body 272 to provide an easy configuration for attachment that is not against the body of the animal. For example, as shown in FIG. 6 the hook 222 of the chest connector 206 may attach to the ring 270 to securing the collar 202 to the chest straps 210.

The connecting body 272 of the collar buckle 219 may be substantially similar to the quick-release the quick-release buckle 216. The connecting body 272 may define two strap-receiving apertures, a narrow slot 281 and a wide slot 282, separated by a median bar 280. The wide slot 282 is capable of easily receiving at least two lengths of straps therethrough. The narrow slot 281 and the wide slot 282 are configured to allow a strap to thread into one and out the other, such that the strap may partially wrap around the median bar 280 and secure the strap to the collar buckle 219. The narrow slot 281 and the wide slot 282 also allow the strap length to be adjustable. Thus, the collar buckle 219 can be used to secure a strap around the connecting body 272 as well as secure a hook, clip or the like to the ring 270.

One side of the collar buckle 219 opposite the wide slot 282 defines a catch aperture 277 bounded by an angled bar 274 that is attached at a top side to a top wall of the body 272 and a straight bar 278 adjacent the narrow slot 281. A strap exit aperture 276 is defined in a bottom wall of the body 272 between the angled bar 274 and the straight bar 278. The strap exit aperture 276 allows a loop in a collar 202 to quickly slide on and off the angled bar 274, allowing the collar 202 to be quickly removed. The pitch of the angled bar 274 with respect to the top and bottom wall of the body 272 helps retain the loop of the collar 202 within the catch aperture 277 and resists the possibility of the loop sliding off on its own, but rather staying secure until a user slides the loop in the collar 202 over the angled bar 274 and through the exit aperture 276.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The foregoing specification, examples, and data provide a complete description of the structure and use of exemplary embodiments of a pet restraint harness system for vehicles. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An animal restraint system for installation on a seat including a headrest within a vehicle comprising;
    a vertical strap having opposing ends and configured to extend along a front of a seat back, a back of the seat back, under the bottom of the seat back, and over a top of the seat back;
    a tether buckle connected to the opposing ends of the vertical strap and configured to tighten the vertical strap around the seat back;
    a single post strap fixed perpendicularly to the vertical strap at approximately a midpoint of the post strap and configured to connect to and extend between a first post and a second post connected to the headrest, wherein the post strap substantially prevents the vertical strap from moving vertically and laterally relative to the seat; and
    a first restraining strap for coupling with an animal harness connected at a first attachment point to the vertical strap.

2. The animal restraint system of claim 1, further comprising:
    a second restraining strap connected at a second attachment point to the vertical strap; wherein
    the first attachment point is positioned closer to the top of the seat back than the second attachment point; and
    the first attachment point and the second attachment point are aligned with one another.

3. The animal restraint system of claim 2, further comprising:
    a first latch attached to an end of the first restraining strap; and
    a second latch attached to an end of the second restraining strap.

4. The animal restraint system of claim 3, wherein
    the first latch is configured to adjust a length of the first restraining strap; and
    the second latch is configured to adjust a length of the second restraining strap.

5. The animal restraint system of claim 4, wherein the first latch and the second latch are configured to attach to at least one of a collar or a harness for an animal.

6. The animal restraint system of claim 1, wherein the post strap comprises:
    a first loop segment and a second loop segment; wherein
    the first loop segment and the second loop segment are configured to be received around the first post and the second post for the headrest for the seat.

7. The animal restraint system of claim 6, wherein the vertical strap further comprises a tab connected to the post strap to fix the vertical strap to the post strap.

8. The animal restraint system of claim 6, wherein the post strap is configured to extend between the first post and the second post of the headrest.

9. The animal restraint system of claim 1, wherein the first restraining strap and the second restraining strap extend from the vertical strap in the same direction.

10. An animal restraint for securing an animal to a seat with a headrest in a vehicle, comprising:
- an adjustable vertical support configured to extend around the front and back of the seat;
- a single horizontal securing element fixed perpendicularly to the vertical support at approximately a midpoint of the horizontal securing element and configured to prevent vertical and lateral movement of the vertical support relative to the seat, wherein the horizontal securing element is configured to extend between and connect to a first post and a second post connected to the headrest and the seat; and
- a top restraint connected to the vertical support, wherein the top restraint is configured to operably attach to a collar or a harness connected to the animal.

11. The animal restraint of claim 10, further comprising a bottom restraint connected to the vertical support and positioned below the top restraint, wherein the bottom restraint is configured to operably attach to the collar or the harness connected to the animal.

12. The animal restraint of claim 10, further comprising:
- a top latch attached to the top restraint; and
- a bottom latch attached to the bottom restraint.

13. The animal restraint of claim 12, wherein the top latch and the bottom latch are buckle hooks.

14. The animal restraint of claim 10, wherein
- the horizontal securing element defines a first loop and a second loop;
- the first loop is configured to receive the first post of the headrest for the seat; and
- the second loop is configured to receive the second headrest post of the headrest.

15. The animal restraint of claim 14, further comprising a tab connected to a portion of the vertical support and configured to extend above a top of the seat and connect to the post strap to fix the vertical support to the post strap.

16. The animal restraint of claim 10, further comprising a tether buckle attached to the vertical support and configured to tighten the vertical support against the seat.

* * * * *